US008145713B1

(12) United States Patent
Irwin et al.

(10) Patent No.: US 8,145,713 B1
(45) Date of Patent: *Mar. 27, 2012

(54) SYSTEM AND METHOD FOR DISPENSING E-CARE

(75) Inventors: Scott A. Irwin, Winter Springs, FL (US); Robert D. Birch, Orlando, FL (US); Stephen D. Weagraff, Orlando, FL (US)

(73) Assignee: Convergys CMG Utah, Inc., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/209,872

(22) Filed: Aug. 15, 2011

Related U.S. Application Data

(63) Continuation of application No. 11/457,048, filed on Jul. 12, 2006, now Pat. No. 8,024,406.

(60) Provisional application No. 60/743,764, filed on Mar. 24, 2006, provisional application No. 60/738,325, filed on Nov. 18, 2005.

(51) Int. Cl.
*G06F 15/16* (2006.01)
(52) U.S. Cl. ........ 709/205; 709/203; 709/204; 709/206; 709/207; 709/238; 709/201
(58) Field of Classification Search .................. 709/201, 709/203–207, 238
See application file for complete search history.

(56) References Cited

U.S. PATENT DOCUMENTS

| 5,022,745 | A | 6/1991 | Zayhowski et al. |
| 5,708,697 | A * | 1/1998 | Fischer et al. ............. 379/88.01 |
| 6,369,954 | B1 | 4/2002 | Berge et al. |
| 6,462,858 | B1 | 10/2002 | MacDonald et al. |
| 6,483,641 | B1 | 11/2002 | MacAulay |
| 6,870,688 | B2 | 3/2005 | Obama |
| 6,970,284 | B1 | 11/2005 | Kim et al. |
| 6,977,777 | B1 | 12/2005 | Wick |
| 7,166,486 | B2 | 1/2007 | Ohtaka et al. |
| 7,251,066 | B2 | 7/2007 | Chao et al. |
| 7,315,886 | B1 * | 1/2008 | Meenan et al. ............... 709/219 |
| 7,387,394 | B2 | 6/2008 | Minegishi |
| 7,756,928 | B1 * | 7/2010 | Meenan et al. ............... 709/205 |
| 2003/0158969 | A1 * | 8/2003 | Gimson et al. ............... 709/246 |
| 2003/0170024 | A1 | 9/2003 | Nishioka et al. |
| 2007/0142029 | A1 * | 6/2007 | Willehadson et al. ........ 455/405 |

* cited by examiner

*Primary Examiner* — Liangche A Wang
(74) *Attorney, Agent, or Firm* — Frost Brown Todd LLC; William S. Morriss

(57) ABSTRACT

An e-Care dispenser is disclosed herein which configures a set of devices to cooperatively process care requests by utilizing functional aspects distributed throughout those devices. The devices can be end user devices with varying capabilities, some of which might not possess resources to process the care request independently. The functional aspects can be distributed throughout the devices in such a manner as to efficiently utilize the devices in providing care.

19 Claims, 7 Drawing Sheets

Figure 1

| Device Capacity | Device Abilities | E-Care Network Function |
|---|---|---|
| Very Low | Monitor Present State; Execute Commands | Carry Out E-Care Instructions |
| Low | Monitor Present State; Store Data; Execute Commands | Carry Out E-Care Instructions; Maintain Device History; Maintain Record of E-Care Usage; |
| Medium | Monitor Present State; Store Data; Execute Commands; Store and Execute Limited Applications | Carry Out E-Care Instructions; Detect Potential Problems; Provide Limited E-Care Solutions; Route E-Care Requests to Other Devices |
| High | Monitor Present State; Store Data; Execute Commands; Store and Execute Complex Applications; Maintain Connection to External Network | Carry Out E-Care Instructions; Detect Potential Problems on Self and Other Devices; Optimize Network to Provide Most Efficient Care; Request Further Support from WAN; Provide Anticipatory Care |

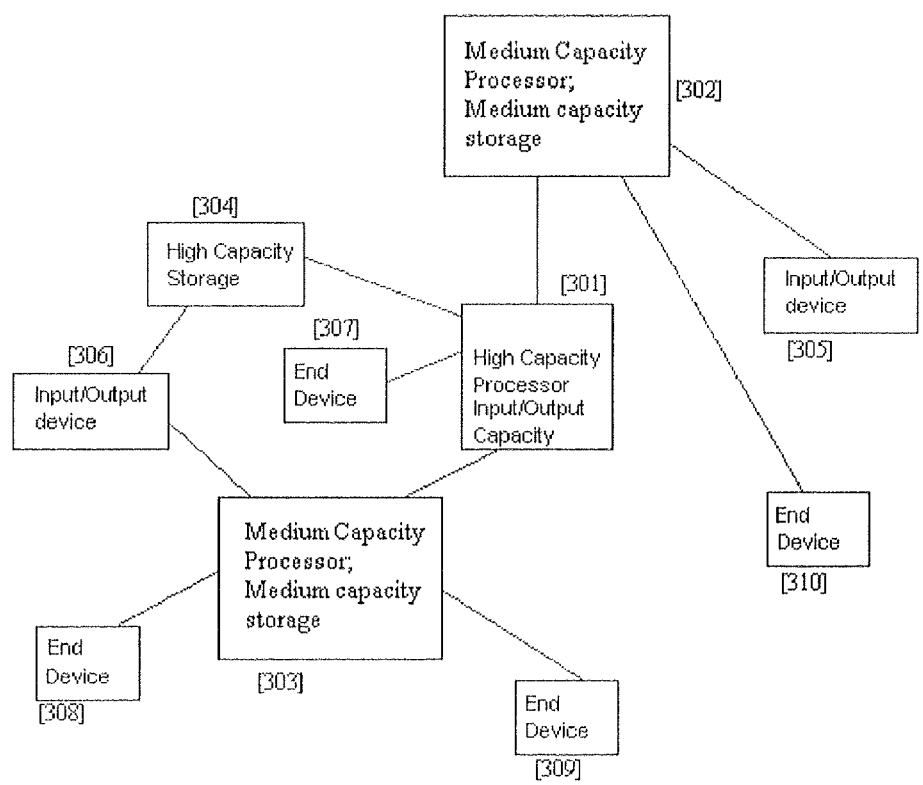

Figure 5.1

| Symptoms Exhibited | Causes Examined |
|---|---|
| Poor Gas Mileage | |
| Large Stopping Distance | |

Figure 5.2

| Symptoms Exhibited | Causes Examined |
|---|---|
| Poor Gas Mileage | Worn out brakes |
| Large Stopping Distance | |

Figure 5.3

| Symptoms Exhibited | Causes Examined |
|---|---|
| Poor Gas Mileage | Worn out brakes |
| Large Stopping Distance | Bald Tires |
| | Improper use of brakes |

Figure 6.1

| Causes Examined | Symptoms Treated |
|---|---|
| Bald Tires | Poor gas mileage |
| | Overheating of joints when driving |
| | Poor acceleration |
| Improper use of brake | Large Stopping distance |
| | Poor traction |
| | Poor cornering |

Figure 6.2

| Causes Examined | Symptoms Treated |
|---|---|
| Driving at excessive speed | Poor traction |
| Driving on wet pavement | Poor cornering |

SYSTEM AND METHOD FOR DISPENSING E-CARE

RELATED APPLICATIONS

This application is a continuation of U.S. patent application Ser. No. 11/457,048, having the same title and filed on Jul. 12, 2006. That application claims the benefit of U.S. provisional application No. 60/743,764 filed on Mar. 24, 2006, and provisional application No. 60/738,325 filed on Nov. 18, 2005. The disclosures of each of those applications are hereby incorporated by reference in their entirety.

FIELD OF THE INVENTION

This invention is in the field of electronic customer care ("e-Care") solutions.

BACKGROUND OF THE INVENTION

Traditionally, electronic distribution of care solutions has followed one of two models: the end user model, where a care application, is stored on an end user device (for example, a personal computer) and functions using the resources of the device on which it is stored; or the client-server model, where an end user device utilizes a network connection to send information to a remote system for diagnostics and remedy decisions.

While these models may have been adequate to supply what care was necessary at a time when most care was directed towards personal computers which had the resources to either host their own care applications, or to maintain a network connection to a remote device which would host the care application, the widespread development of intelligent devices has caused the traditional models to become obsolete. Some intelligent devices, for example, smart refrigerators, may not have sufficient memory to host care applications, nor a network connection to connect to a remote device. Others, such as game consoles, might have the capacity to host some limited care applications, but might not have the network or memory capacity necessary to effectively support one of the traditional care models. An invention which would allow such devices to utilize electronic customer care would increase the satisfaction of consumers using those devices, and decrease the customer service costs associated with those devices.

SUMMARY OF THE INVENTION

Potentially, an embodiment of this invention might comprise a computer readable medium comprising instructions operable to configure a plurality of end user devices. For the purpose of understanding the nature of such embodiments, the term "end user device" should be understood to refer to any device which is able to be accessed, possessed, controlled, or used by an end user. Examples of end user devices include personal digital assistants (PDAs), personal computers (PCs), set top boxes, game consoles, and digital cameras. The term "end user," as used in this context, is meant to distinguish individuals who use a device from the individuals who enable a device to be used (e.g., developers, installers, system operators, repairpeople, etc. . . . ). Of course, it should be understood that there can be significant overlap between individuals who use a device and the individuals who enable a device to be used. For example, an individual might change the batteries in his or her digital camera, acting both in the capacity of a user of a device and in the capacity of one who enables a devices to be used. Thus, whether an individual should be considered an end user is highly dependent on context and the activity or activities that the individual is engaged in at the time the status determination is made. Further, the phrase "computer readable medium" should be read broadly to include any object, component, or combination of objects or components, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space.

In some embodiments comprising a computer readable medium comprising instructions operable to configure a plurality of end user devices, the instructions might be operable to configure those devices to cooperatively process a care request. In this context, the term "care request" should be understood to mean a set of data indicating a need for care to be provided, or a set of data which could be analyzed to discover a need for care to be provided to enable a user to use a device. The term "care" should be understood to mean any action or set of actions which are intended to allow the device to maintain or achieve a desired level of functionality, or to facilitate a user's use of a device. The verb "process" (and the various forms thereof), when used as a verb in this context, should be understood to mean performing mathematical and/or logical operations on data in order to achieve a result. In the context of processing by end user devices, the term "cooperatively" should be understood to refer to processing through the joint action or using the combined resources of two or more end user devices. The term "cooperatively" should be read broadly enough to include actions which take place on multiple end user devices simultaneously (or near simultaneously) to achieve a common goal (e.g., parallel processing), as well as actions which take place on multiple end user devices at different times to achieve a common goal (e.g., serial processing).

In such embodiments, cooperatively processing a care request might comprise a plurality of steps comprising initiating processing of the care request, sending the care request, receiving the care request, and/or continuing processing of the care request. In this context, the term "step" should be understood to refer to an action measure or process which might be taken to achieve a goal. It should further be understood that, unless an order is explicitly set forth as "necessary" through the use of that word, steps are not limited to being performed in the order in which they are presented, and can be performed in any order, or in parallel. Similarly, "initiating" processing should be understood to refer to an act which leads to the performance of mathematical and/or logical operations on data, while "continuing" processing should be understood to refer to any act which carries forward or is based at least in part on processing which has previously been initiated. A non-limiting example of continuing processing would be, after determining a set of two or more possible actions to provide care in response to a care request, requesting additional data and using that data to help determine which of the possible actions are most appropriate for providing care.

For purposes of clarity, the verb "send" (and the various forms thereof), in the context of a care request, should be understood to refer to an entity or device making the care request available to one or more other entities or devices. It should be understood that, in this application, the word "sending" does not imply that the entity or device sending a care request has a particular destination selected for that care request, thus, as used in this application, a message could be sent using the well known prior art method of writing the message on a piece of paper, placing the paper in a bottle, and throwing the bottle into the ocean. Of course, the above example is not intended to imply that the word "sending" is restricted to situations in which a destination is not known. Thus, sending a care request refers to making that request available to one or more other devices or entities, regardless of whether those devices or entities are known or selected by sender. One particular type of sending is "broadcasting," which is transmitting data from a device for the general use and availability of one or more other devices. In a vein similar to sending, the verb "receive" (and the various forms thereof) should be understood to mean obtaining access to something. It should be understood that the word receiving does not imply obtaining exclusive access to something. Thus, a message could be received through the well known prior art method of reading a notice posted on a bulletin board. Of course, that example is not intended to exclude situations where a device or entity gains exclusive access from the scope of the verb "receive."

In some embodiments comprising a computer readable medium comprising instructions operable to configure a plurality of end user devices to cooperatively process a care request, wherein cooperatively processing the care request comprises a plurality of steps, each of those steps might comprise an acting end user device, from the plurality of end user devices, utilizing a functional aspect hosted on the acting end user device. For purposes of clarity, the term "acting end user device" should be understood to refer to any end user device which is performing one or more steps, or making one or more of its resources available. For purposes of clarity, the term "functional aspect" should be understood to refer to an attribute, capability or resource which must be coordinated or combined with other functional aspects to service a care request. As will be made clear in the description of the embodiments, functional aspects can refer to hardware functional aspects (e.g., a network connection), software functional aspects (e.g., a module performing a particular function, such as determining how to route data in a network), and other types of functional aspects (e.g., data stored on a computer readable medium and used when processing particular types of requests). With that in mind, a functional aspect "hosted" by an end user device is a functional aspect that is stored on, or incorporated into, an end user device. For example, an end user device storing a software module which could be used with other functional aspects to process a care request would be hosting that software module.

In an embodiment comprising a computer readable medium comprising instructions operable to configure a plurality of end user devices to cooperatively process a care request, cooperatively processing a care request might comprise a first end user device in the plurality of end user devices initiating processing of the care request and sending the care request. In such an embodiment, cooperatively processing the care request might further comprise a second end user device from the plurality of end user devices receiving the care request and continuing processing of the care request.

In some embodiments comprising a computer readable medium comprising instructions operable to configure a plurality of end user devices to cooperatively process a care request, wherein cooperatively processing a care request comprises sending the care request, sending the care request might comprise utilizing a sneakernet. For the sake of clarity, in this context, the term "utilize" should be understood to refer to using a device for a purpose, though not necessarily the purpose for which the device was designed. As a non-limiting example of such a use, in some embodiments, a video game console might be used to process a care request, even though that device was designed for the purpose of providing electronic entertainment. As will be known to those of ordinary skill in the art, a "sneakernet" is a jargon term for manually transmitting data by carrying it from one place to another on a floppy disk or other medium. Thus, utilizing a sneakernet should be understood to mean manually transporting data using a floppy disk or some other portable computer readable medium.

Some embodiments comprising a computer readable medium comprising instructions operable to configure a plurality of end user devices might further comprise instructions operable to configure a broadcasting end user device to broadcast a set of data comprising an indication of a capability of the broadcasting end user device, or might comprise instructions operable to perform an act of distributing the aspects of the care application throughout the plurality of end user devices. The term "data" should be understood to mean information which is represented in a form which is capable of being processed, stored and/or transmitted. The term "set of" should be understood to mean a group comprising one or more members. The term "indication" (and the various forms of the related verb "indicate"), when used in this context, should be understood as something which points to, suggests or specifies. A "capability," then, should be understood to refer to a capacity to be used for a specific purpose.

In some embodiments comprising a computer readable medium, the computer readable medium might comprise instructions operable to distribute a plurality of functional aspects within a plurality of end user devices. In this context, the verb "distribute" (and the various forms thereof), should be understood to mean disperse among a set of targets. For the purpose of clarity, the particular type of distribution in which each target receives one or more of the items being distributed shall be referred to as "distributing ... throughout," where the ellipsis represents words which have been omitted between the form of the verb "distribute" and the adverb "throughout." In such a distribution, it is possible that multiple targets will have the same item distributed to them. An alternate type of distribution is a distribution wherein items are dispersed among targets, but not all targets necessary receive one of the items being distributed. That type of distribution shall be referred to as "distributing . . . within," where the ellipsis represents words which have been omitted between the form of the verb "distribute" and the adverb "within." It should be understood that distributing ... throughout is a special case of distributing . . . within, and that use of the construction distributing ... within does not necessarily indicate that the items being distributed are not distributed ... throughout. It should further be understood that the phrases "distributing within" and "distributing throughout", when used without words between the form of the verb "distribute" and the adverb "within" or "throughout" have the same meaning as set forth above. It should also be understood that some embodiments might comprise a computer readable medium comprising instructions operable to distribute a plurality of functional aspects throughout the plurality of end user devices.

In some embodiments comprising a computer readable medium comprising instructions operable to distribute a plurality of functional aspects within a plurality of end user devices, distributing the plurality of functional aspects might be based at least in part on a set of functional aspects hosted on the end user devices within the plurality of end user devices. Similarly, some embodiments comprising a computer readable medium comprising instructions operable to distribute a plurality of functional aspects with a plurality of end user devices might base that distribution at least in part on a set of demand information for the end user devices within the plurality of end user devices. For the purpose of clarity, in this context, the phrase "demand information" should be understood to refer to data related to the use made of the functional aspects of the plurality of end user devices.

In some such embodiments, distributing the plurality of functional aspects within the plurality of end user devices comprises distributing the plurality of functional aspects within the plurality of end user devices based at least in part on whether a particular functional aspect from the plurality of functional aspects is already hosted on a end user devices within the plurality of end user devices. The term "particular", when used in this context, should be understood to be a term used to identify a functional aspect, rather than being a term used to indicate a substantive attribute of the functional aspect.

Additionally, some embodiments might comprise a method of providing care for an end user device comprising creating a care request comprising data related to the end user device. Further such a method of providing care for an end user device might comprise cooperatively processing the care request using a plurality of devices. In such an embodiment, cooperatively processing the care request might comprise receiving the care request at a first device from the plurality of devices, using a first functional aspect hosted on the first device to process the care request, and using a second functional aspect hosted on a second device from the plurality of devices to continue processing the care request. Further some such embodiments might additionally comprise sending the care request to a predefined address. For the purpose of clarity, the term "predefined address" should be understood to mean data which could be represented as a sequence of characters such as an internet protocol address which can be used to identify and access particular computer resources and which is determined prior to the creation of the care request. Additionally, the term "create" (and various forms thereof) should be understood to refer to define, assemble, derive, or otherwise cause to come into being.

Potentially, an embodiment of this invention could comprise a method of cooperatively processing a care request, comprising the steps of: creating, at a requesting end user device in a plurality of end user devices, a care request comprising a set of data; receiving, at a first end user device in the plurality of end user devices, the care request; utilizing the first end user device to initiate processing of the care request; after utilizing, the first end user device to initiate processing the care request, utilizing a second end user device in the plurality of end user devices to continue processing the care request; after utilizing the second end user device to continue processing of the care request, determining a response based at least in part on the set of data; and sending the response to the requesting end user device. For purposes of understanding such a method, the term "determining" should be understood to mean to decide upon, or to indicate. For the purposes of this application, the term "determining," especially in the context of determining a response should be read broadly to include choosing from a series of potential responses, creating a new response based on some data, combining potential responses to create a response, or any other method of indicating a response which could be implemented or otherwise used or stored by any device or other entity. Similarly, a "response" should be understood to refer to any message, set of data, or any other thing or action which is generated, created, selected or otherwise indicated based at least in part on one or more inputs. In the above described method, a "requesting device" should be understood to be a device for which care is or could be provided based on a care request.

In some embodiments of the type described in the previous paragraph, the step of sending the response to the requesting end user device might comprise "routing" the response to the requesting end user device, which should be understood to mean directing to a particular destination, though that routing should be read broadly, such that any act which has the tendency to advance progress towards a destination (e.g., sending a set of data to a point from which it will be further directed towards its destination) should be understood to be described by the term "routing."

In some embodiments which comprise a method of cooperatively processing a care request, the method might comprise using instructions stored on a computer readable medium to coordinate a plurality of functional aspects distributed within the plurality of end user devices. Alternatively, or in addition to using instructions as set forth above, some embodiments might use instructions stored on a computer readable medium to coordinate a plurality of functional aspects distributed throughout the plurality of end user devices. In this context, the verb "store" (and the various forms thereof) should similarly be read broadly to include any act of preserving or maintaining, however brief in duration that act might be. The verb "coordinate" (and the various forms thereof) should be understood to refer to using to achieve a particular goal or effect.

In some embodiments which comprise a method of cooperatively processing a care request, the method might comprise evaluating an option of processing a care request using an additional device, which might comprise a back end device. In some such embodiments, evaluating the option of processing the care request using the additional device might be based at least in part on a set of capabilities of the additional device. For the purpose of clarity, in this context, the term "evaluating" should be understood to mean processing data related to an option in order to determine whether to take an action represented by that option. In turn, the term "option" should be understood to refer to any action or set of actions which might or might not be taken depending on surrounding circumstances. The term "additional" should be understood to mean existing in addition to another. Thus, in the context of devices, an "additional device" should be understood to refer to a device which exists in addition to at least one other device. The term "back end device" should be understood to refer to a device which is intended for interaction or communication with other devices rather than with end users. A non-limiting example of a back end device would be a server which can only be accessed by end users through remote terminals.

In some embodiments comprising a method of operating a plurality of devices, the method might comprise the steps of: assembling a set of working data comprising data related to actions taken to process the care request; evaluating an option of processing the care request using an additional device; and, based at least in part on the step of evaluating an option, sending the set of working data to an additional device. In this context, the term "assembling" should be read broadly to refer to any act of collecting, bringing together, encapsulating or otherwise generating a set of some previously scattered, disorganized, or non-existent data. The term "working," when used as an adjective in this context, should be understood to mean serving as a basis or guide for further work or processing. Similarly, the term "related to" should be understood to mean being connected to, derived from, or associated with in some manner. Some embodiments which comprise both assembling a set of working data and evaluating an option of processing a care requesting using an additional device as described above might further comprise sending the set of working data to the additional device.

In some embodiments comprising a method of cooperatively processing a care request, the method might comprise periodically communicating with a back end device. Alternatively, or in addition, the method might comprise sending, from an end user device in the plurality of end user devices, a capability of the end user device. In this context, the phrase "communicating with" should be understood to include sending data to the back end device, as well as receiving data from the back end device. In this context, the term "periodically" should be understood to mean occurring based at least in part on a temporal trigger. As non-limiting examples, periodic communications might include a scheduled connection to transmit data to a back end system which takes place every twelve hours, or a connection established by the back end system in response to not receiving a communication from a device within a given period of time.

Either in addition to, or as an alternative to, the computer readable media and/or the methods described heretofore, some embodiments of the invention might comprise a system comprising: a plurality of end user devices, a plurality of functional aspects hosted on the end user devices throughout the plurality of end user devices; and a set of computer executable instructions. That set of computer executable instructions might be operable to: create a care request comprising a set of data related to a requesting end user device from the plurality of end user devices; initiate processing of the care request using a first functional aspect hosted on a first end user device from the plurality of end user devices; continue processing of the care request using a second functional aspect hosted on a second end user device from the plurality of end user devices; and/or route a response to the care request to the requesting end user device.

For the purpose of clarity, it should be understood that numerical terms such as "first" and "second", when used in the summary section, or the claims section of this specification, are used to distinguish elements of a claim, and are not intended to imply a numerical or serial limitation. It should further be understood that numerical terms such as "first" and "second" are not intended to be exclusive of descriptive modifiers such as "requesting." Thus, in some embodiments which are described as comprising both a "first" end user device and a "requesting" end user device, the "first" end user device and the "requesting" end user device might be the same device.

Some embodiments comprising a system of the type described in the preceding paragraphs might further comprise a back end device operable to send a set of functional aspects to the plurality of end user devices. In an embodiment comprising a system comprising a set of computer executable instructions, the computer executable instructions might be operable to register an end user device in the plurality of end user devices. In this context, the phrase "computer executable instructions" should be understood to refer to commands which can be put into effect by a computer, wherein a "computer" should be broadly understood to include any device which is capable of processing data according to a program to achieve a result. Further, the term "register" should be understood to refer to notifying one or more additional devices of a device's existence and/or one or more capabilities of that device and/or functional aspects of that device.

In some embodiments comprising a system comprising a plurality of functional aspects, the functional aspects might comprise a sensor aspect, an actuator aspect, a knowledge base aspect, and/or an engine aspect. The "sensor" aspect should be understood to mean an aspect which is used to collect data related to a device which could be analyzed to provide that device with care. For example, some embodiments of the invention might use the speedometer of an automobile as a sensor. The "actuator" aspect should be understood to mean an aspect which could be used to implement one or more commands to provide care to a device. For example, some embodiments of the invention might use a switch which disengaged the emergency brake of an automobile as an actuator. The "knowledge base" aspect should be understood to mean an aspect which can be used for storing data which would be used in that embodiment. For example, some embodiments of the invention might use the hard disk of a personal computer as a knowledge base aspect. The "engine" aspect should be understood to mean an aspect which can be used to process a set of data and determine one or more actions to take in response, or to perform in order to continue processing the data.

BRIEF DESCRIPTION OF THE DRAWINGS

FIG. 1 is a table showing different possible device capacities that could work together, in one embodiment of the invention, to provide e-Care.

FIG. 3 is a diagram of a network configuration which allows routing of requests throughout the network, and cooperation between devices with different capabilities.

FIGS. 5.1, 5.2 and 5.3 are tables which demonstrate examples of information which might accompany a care request in order to allow that request to be efficiently routed through a network.

FIGS. 6.1 and 6.2 are tables which demonstrate the type of information which might be provided by devices in some embodiments of the invention to aid in routing care requests.

DETAILED DESCRIPTION OF THE EMBODIMENTS

In some embodiments of the invention, a plurality of devices might be configured to cooperatively provide care to various individual devices. Throughout this application, such a cooperative plurality of devices will be referred to as an e-Care dispenser. All embodiments described herein are intended to be illustrative and, therefore, non-limiting.

Figure 2:
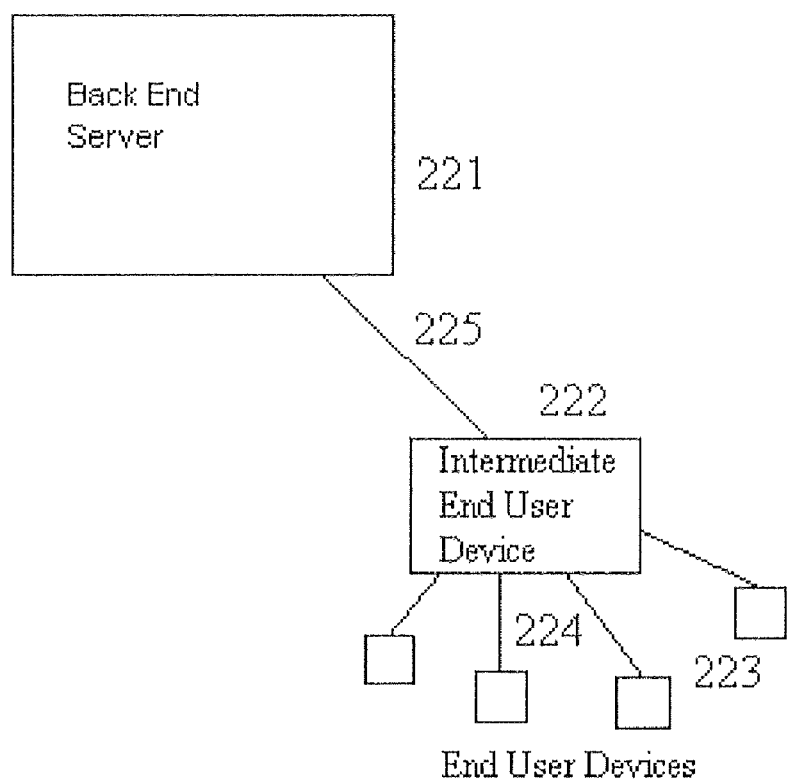
FIG. 2 is a diagram demonstrating a possible network configuration for an embodiment of the invention which uses a federated architecture.
Figure 2A:
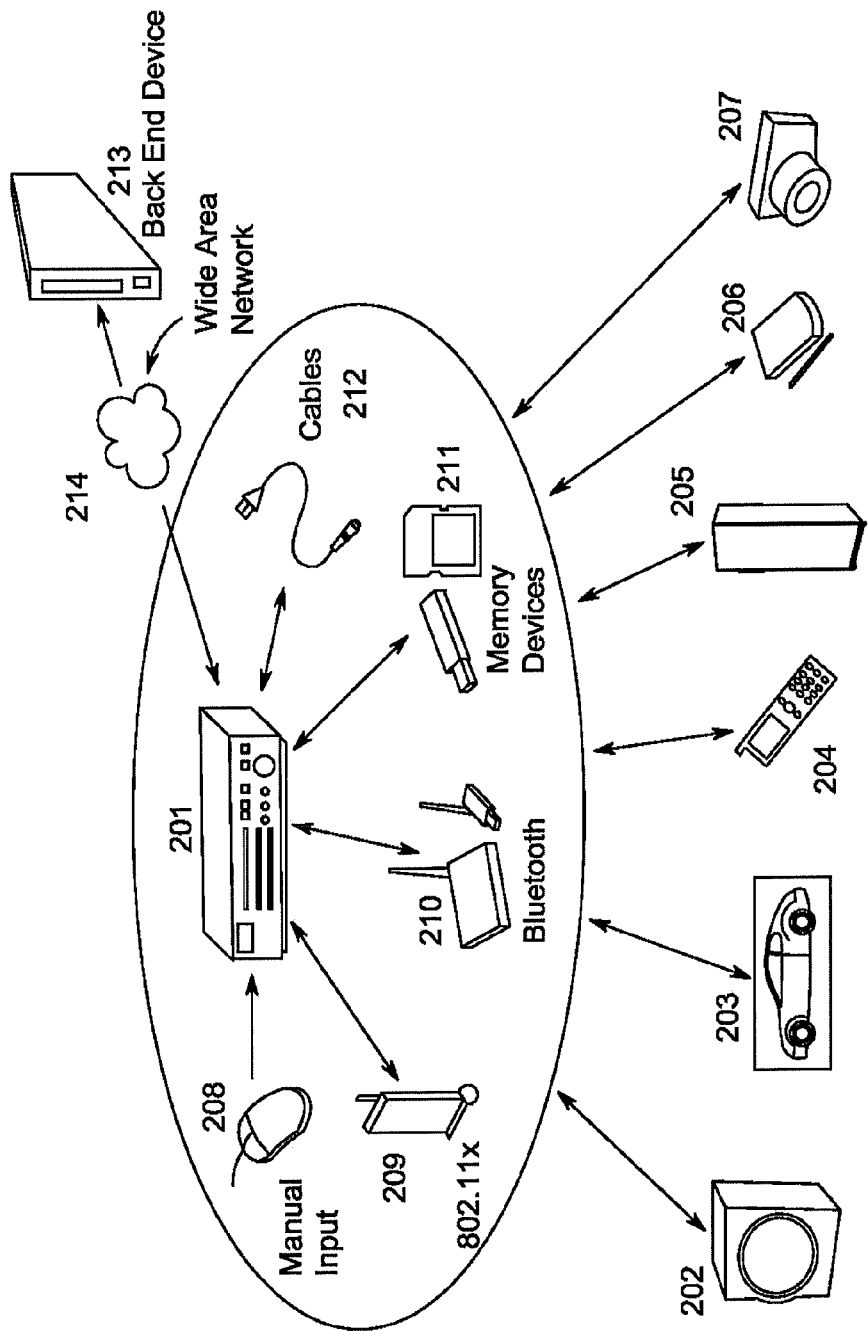
FIG. 2A is a diagram of one possible configuration in which a number of end user devices may utilize one or more data channels to communicate with another end user device which in turn communicates with a remote system.

FIG. 2A shows some examples of various end-user devices, including a game console [201], a washing machine [202], an automobile [203], a phone [204], a refrigerator [205], a palm pilot [206], and a camera [207], for which an e-Care dispenser might be used to provide care. In the case of some of the end-user devices shown in FIG. 2A, those devices might not have the resources necessary to provide care for themselves, and might also lack the network connectivity necessary to communicate with a back end device to obtain care. Thus, some embodiments of the invention allow even devices which do not have the capacity to process their own care requests to receive care without requiring an end user to call a helpline or a repairperson. Additionally, FIG. 2A depicts various technologies which might be used to communicate data between the devices of the e-Care dispenser, including manual input through a mouse [208], a wireless local area network [209], a wireless Bluetooth connection [210], a memory device such as might be used in a sneakernet connection [211], and physical cables [212]. FIG. 2A also depicts a back end device [213], which might be connected to one of the other devices through the use of a wide area network [214]. Of course, all such devices and technologies depicted are intended to be illustrative only, and not limiting on the types of devices or technologies which might be utilized in various embodiments of the invention. Further, it should be understood that the network technologies depicted could easily be substituted one for another. For example, there might be a wide area network connection between the palm pilot [206] and the game console [201], and a local area network connection to the back end device [203].

In some embodiments of the invention, an e-Care dispenser might comprise one or more care applications comprising a plurality of aspects such as input, output, engine, knowledge base, network connectivity, sensor and/or actuator. The input aspect is any means which allows data to be communicated to one or more of the devices in the e-Care dispenser. For example, in some embodiments of the invention, the dispenser might use a controller of the kind used to play games on an XBOX or other consumer game console as the input. The output is any means which allows data to be communicated from one or more of the devices in the e-Care dispenser. For example, in some embodiments of the invention, the c-Care dispenser might use the display capabilities of a television screen as output. Network connectivity refers to any mechanical, electrical, optical or other means by which a device could transmitted between a device and a local or remote device. Different embodiments of the invention might use Wide Area Network (WAN), Local Area Network (LAN), or Personal Area Network (PAN) connections, as network connectivity.

As an example of an e-Care dispenser made up of numerous devices, consider that, in some embodiments, an e-Care dispenser might collectively be made up of a smart car, hosting the sensor and actuator aspects, an XBOX, hosting the engine, a television connected to the XBOX providing the output aspect, the controller ports for the XBOX, providing input capability, a home computer, providing knowledge base storage, and a DVD player, storing additional knowledge. In this embodiment, data might be transferred between devices either through SneakerNet connections, such as if a consumer transferred the data gathered from the sensor in the smart car to the personal computer through a USB port, or through a wired or wireless connection, such as a video feed between the XBOX and the television.

As an example of how embodiments of the invention might allow care to be dispensed through the collective efforts of such a group of devices, consider the case of a consumer who notices that his or her automobile is getting poor gas mileage. The automobile, acting as a sensor, might collect data on the state of the automobile and the user's driving habits. The user could decide to seek care either because he or she notices that the automobile is getting poor gas mileage, or because the automobile detects that it is getting poor gas mileage and informs the user that care is necessary. The user could then utilize some type of electronic media to transfer the information to the XBOX, perhaps using the input capacity of the XBOX controller or a data port (such as a memory port or a controller port) on the XBOX. The XBOX, acting as the engine, could process the data provided by the user, and use the output capacity of the television set it was connected to in order to request that the user establish a connection to the knowledge base storage of the personal computer. Alternatively, depending on the networking capabilities of the relevant devices, the XBOX might request that the user use some sort of electronic memory element such as USB flash memory in order to transport the relevant knowledge from the personal computer to the XBOX. The personal computer might then make its knowledge base accessible to the processor on the XBOX in order to solve the problem indicated by the data provided by the automobile. Alternatively, the personal computer might request that the user establish a connection to the additional knowledge stored on the DVD player, perhaps encoded into a specially provided DVD. If necessary, in some embodiments of the invention, the personal computer might also poll remote servers, or other back end devices, and request further assistance if local devices did not have sufficient knowledge for the XBOX to find a solution. In this example, when the XBOX completes processing, it might take a number of actions. First, it might write commands onto the USB thumb drive or other media which had transported the data from the automobile. These commands could then be transported back to the automobile, which might function as an actuator to execute the commands and solve the problem of poor gas mileage (for example, by automatically disengaging the emergency brake, if the user had been driving with it on). Alternatively, the XBOX could use the output capacity of the television to give instructions to the user to take further steps to receive care.

As an additional example of how embodiments of the invention might allow care to be dispensed through the collective efforts of such a group of devices, consider the case of a mobile device where a user could not send MMS messages. The mobile device, acting as sensor would collect data on its internal state, which the user could transport to a second device using an electronic medium such as a USB thumb drive. The second device, this time functioning as both the knowledge base and the care engine, might determine that the problem was caused by an incorrect URL setting for the MMS server. The second device would then write the appropriate instructions on the electronic medium which was used to transport data to it from the mobile device, and then instruct the user to transport the electronic medium back to the mobile device, either using its own native output capacity or the output capacity of another device in collaboration. The user would then transport the electronic medium back to the mobile device which, functioning as actuator, would change the URL setting for the MMS server to the correct one.

In some embodiments, either in addition to, or as an alternative to the care described above, which focused on remedying problems with an end user device (e.g., changing a URL setting, disengaging an emergency brake), or in addition to the care described above, care might be provided which focuses on a user's use of a device, rather than on the device itself. For example, in the scenario above, where a user was experiencing difficulty sending MMS messages, suppose that, instead of discovering an incorrect URL setting for an MMS server, the second device discovered that the user was instructing the mobile device to save messages, rather than sending them. Such a discovery might be made by analyzing data stored on the mobile device indicating the user's use history, and finding that the user invariably saved MMS messages, and never sent them. The second device might then provide care in the form of a tutorial for the user. For example, if the second device was a game console, it might use the output capacity of a television set it was connected to to provide a video demonstration showing the user how to send MMS messages rather than saving them. Alternatively, the second device might create a tutorial and then transfer it to a third device, for example, a television connected to a DVD player, which could present the tutorial to the user, thus freeing the resources of the second device for other purposes.

Yet another type of care which might be provided, either in addition to, or as an alternative to the device care, application care, and/or user care described herein is relationship care, which consists of care related to a user's relationship with one or more service providers. For example, in the scenario above, suppose that, instead of discovering that the user was operating the mobile device improperly, or that there was an incorrect URL setting, the second device discovered that the user could not send MMS messages because sending such messages was not allowed by the user's contract with his or her mobile service provider. Such a discovery might be made by examining service contract information, as well as device usage history which might be stored on the mobile device and transferred to the second device as a service request. In such a scenario, the second device might provide care by recommending that the user upgrade his or her contract with the mobile service provider. Further, the care might comprise establishing a network connection with the service provider and allowing the user to upgrade his or her contract automatically.

As another example of how this type of care might be provided using an embodiment of the invention, consider a scenario in which a consumer believes that his or her mobile phone bill is too high. In such a situation, the consumer's mobile phone, acting as a sensor, might collect data on the consumer's use history. The mobile phone might then send that information as a care request to the consumer's personal computer. The personal computer, acting as the engine, could process the data provided by the mobile phone, and might determine that the reason the consumer's bill was higher than expected is because most of the consumer's calls take place during peak hours, or because the consumer has chosen a rate plan which consistently provides fewer minutes than the consumer actually uses. In this scenario, the relevant information regarding the consumer's rate plan might be obtained by establishing a network connection with a back end device, might have been provided by the mobile phone as part of the care request, or might be stored on one of the devices collaborating to provide care. Once the care request had been processed, the personal computer might suggest that the user change rate plans, reschedule his or her calling, or take some other action, as appropriate. In some embodiments the computer might act as an actuator, and provide care by automatically establishing a network connection with the consumer's mobile service provider and allowing the consumer to choose a more appropriate rate plan. Of course, additional types of care which could be provided will be immediately obvious to one of ordinary skill in the art. Therefore, the care examples given in this specification should be understood to be illustrative only, and not limiting.

Some embodiments of the invention might move beyond the relatively self-contained model of the previous example. In that example, the personal computer requested help from the external device only when it did not already have sufficient knowledge to process the care request. In other embodiments of the invention, the personal computer, or other device with the capacity to connect to remote devices, might periodically request new or updated care applications (or aspects for use in care applications) and/or knowledge from those remote devices in order to synchronize information and ensure that the care abilities of the devices collaborating together was up to date. It should be understood that, in some embodiments, remote devices might comprise back end devices, though remote devices are not limited to back end devices, and can be end user devices as well.

In addition to allowing multiple devices to collaborate to service care requests, some embodiments might be designed to use the devices to service care requests in an efficient manner. For example, in the case of multiple devices providing the same capacity (e.g., multiple game consoles each providing the capacity of a processor), efficiency of device utilization might be increased by intelligent routing algorithms designed to consider factors including, but not limited to, a description of the issue, diagnostics captured on the device, and attempted remedies. Additionally, in some embodiments of the invention, there might be multiple back end systems which could be accessed in order to provide care. In some such embodiments, algorithms might be used to allow requests to be routed to an appropriate back end system based on information gathered or created by the device requiring care or by other devices. For example, the decision as to which back end system a request should be referred to could be based on the determination of a potential root cause for a problem on the device requesting care. In further embodiments of the invention, different devices working to provide care might switch between multiple functions depending on care requirements. For example, a personal computer might have the capacity to act as a connection to a remote server, a knowledge base storage device, and a CPU. If that computer was interacting with other devices to provide e-Care, and those devices had a shortage of network connections to remote servers, but a surfeit of processors (as might be the case if the user had multiple game consoles), then the personal computer might focus its resources on acting as a knowledge base and interacting with remote servers, rather than utilizing its processing capabilities.

It should be understood that different embodiments of the invention will support different methods of providing for the interaction between the aspects within the e-Care dispenser. For example, in some embodiments of the invention, virtually all of the aspects will be concentrated on one device, such as a personal computer, while many other devices will intermittently connect to the personal computer through various data transmission mechanisms such as USB thumb drives or network connections as described above. In such an embodiment, most aspects would be connected using the hardware which makes up the personal computer, while a few would be connected using an interface provided by the personal computer and the device being serviced. In such an embodiment, software for routing many of the care related tasks might be unnecessary, because the capacity for accomplishing those tasks would be resident on one device. On the other hand, other embodiments which distribute the aspects over a larger number of devices might use a variety of systems to manage their resources. For example, some embodiments of the invention might assign specific aspects within the e-Care dispenser to specific well known addresses, which different devices on a network could query when in need of services. Such well known addresses might be incorporated in devices which require care as predefined addresses which could be accessed when a care request needs to be processed. Other embodiments might function by allowing devices to broadcast requests for specific care services over available networks, such as a building-wide local area network or a wireless Bluetooth network, or to other machines in the device's vicinity, for example, if a preexisting network was not present. Alternatively, some embodiments might allow devices to discover each other by broadcasting the services they offer, rather than the services they need. For example, in one such embodiment, a device which has engine capacity might send periodic messages to all other machines on the network, or to all other machines in the device's vicinity, if a preexisting network either was not present, indicating that it could aid in the collaborative dispensing of care by allowing other devices to use its engine capacity. Still further embodiments might use a federated network in which devices might register their capabilities and requirements and then routing and servicing decisions could be made based on the capabilities which had been registered. Some embodiments using such a federated network might also allow for conservation of resources by only hosting the knowledge and applications necessary to service the devices which had registered, and then deleting some portion of their knowledge when appropriate, such as when a device explicitly unregistered.

While it should be understood that those of skill in the art will be able to conceptualize virtually limitless variations on the connectivity of devices providing and receiving care and that the invention is not intended to be limited to those which are listed, further illustrative examples will be helpful to demonstrate embodiments of the invention.

FIG. 2 illustrates an embodiment of the invention utilizing a federated network comprised of a hierarchical network of numerous end user devices (such as smart cars) which host only a few aspects, an intermediate end user device (such as a personal computer), which hosts the majority of aspects of the e-Care Dispenser, and a back end device which functions to provide assistance when the intermediate end user device exhausts its resources. FIG. 2A illustrates some particular end user devices which could interact to form a network of the type represented in FIG. 2. In this federated network, each of the end user devices [223] might register with the intermediate end user device [222], which could be any end user device which has the capacity to host multiple care applications, or multiple aspects of one or more care applications, and establish a network connection [225] as needed. Once the end user device [223] had registered with the intermediate end user device [222], the intermediate end user device [222] might utilize the network connection [225] to contact the back end server [221] and request that it send the care applications (and/or instructions for the aspects thereof) necessary to provide services for each of the end user devices [223]. Subsequently, when the end user devices [223] required care, they could transmit data regarding their current state using their local network connections [224] to the intermediate end user device [222]. If the intermediate end user device [222] was able to solve the problem with the resources it already possessed, it would do so, and it would use the local network connections [224] to send the solution back to the end user devices [223]. If the intermediate end user device [222] was not able to solve the problem, it might request further care resources from the back end server [221] in order to provide service. Then, depending on the capacity of the intermediate end user device [222], the back end server [221] might either attempt to solve the problem itself, or send the appropriate care applications, aspects or updates, to the intermediate end user device [222].

In another embodiment of the invention which also uses a federated network architecture, the intermediate end user device [222] might maintain a record of end user devices [223] to which it might provide care, and may update this record as necessary when an end user device [223] either registers, or sends a notification that it no longer needs service. Additionally, in some embodiments of the invention, the intermediate end user device [222] might provide care services for itself, in addition to providing care to the end user devices [223].

100491 FIG. 3 demonstrates an embodiment of the invention which utilizes one form of task routing and allows different devices to interact to utilize their resources most efficiently. In order to understand how the embodiment of FIG. 3 might function, assume that one of the end devices [309] requires care. Since that end device [309] is connected to only one other device [303], the end device [309] sends its request to that device [303]. When it receives the request, that device [303] can either route it to another device, such as the device [301] with the highest processing capacity, or try to service the request locally, depending on the routing function being used in this embodiment. For the purpose of understanding how assistance is requested in some embodiments, assume that the device [303] seeks to fulfill the request of the end device [309] without requesting assistance from any other device. Further, assume that, while the device [303] is processing the request of the first end device [309], a second end device [310] encounters a problem and requests care from the same device [303]. In this case, the device [303] might not have the resources to process the requests of both end devices [309][310] simultaneously, and so might forward the request to another device [301], which does have such capacity. That device [301] might then process the request and provide care to the end device [310], perhaps utilizing the capabilities of other devices in the process (e.g., [304]). Alternatively, that device [301] might check to see if there was some other device which could process the request of the end device [310]. If it found such an unoccupied device [302], it might route the request of the end device [310] to it, thus conserving its resources for other tasks, such as routing data and commands throughout the network, or communicating over a WAN connection [311] with a back end care server which could potentially provide further resources and/or assistance.

Thus, this example, based on FIG. 3, demonstrates not only a method for routing requests throughout a network of devices which act together to provide care to numerous end devices, but also shows a way of splitting up tasks which might otherwise be concentrated within one aspect of the care dispenser. In the above example, the task of care provision was split between three different devices [301][302][303] even though they all used the care engine aspect of the care dispenser. This basic concept can be applied to any modular portion of the aspects of the invention, such as storing different aspects of the knowledge base on different devices, and different embodiments of the invention will use various approaches to distribute functional aspects within a network of devices which are working to dispense care. It is possible in some embodiments of the invention that a device which hosts a large number of care applications (such as a personal computer) might distribute some of those applications throughout the network as the need arises in order to avoid becoming a bottleneck. It should be understood that such distributing might include simply routing various aspects to the devices where they will eventually be hosted, or might comprise actually performing a remote installation of those aspects on their target devices, or might include some other type of distribution.

Figure 4:
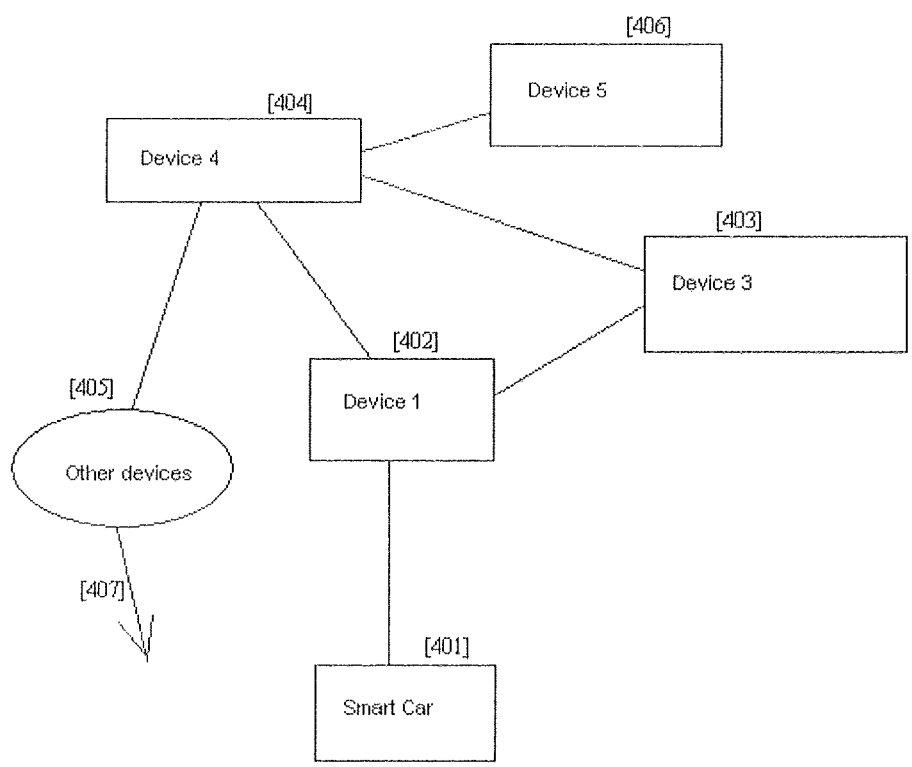
FIG. 4 is a diagram of a network configuration which might utilize embodiments of the invention that use various routing algorithms.

One algorithm which might be used to route care requests in some embodiments of the invention might use tables of the type shown in FIGS. 6.1 and 6.2, on a network of the type shown in FIG. 4. In such a network, a smart car [401] might detect that it was getting poor gas mileage and that its stopping distance was unacceptably large. However, the smart car [401] might not have sufficient capabilities to determine the cause of those problems, or to arrive at a solution. Thus, it might send data it had collected, and a request for help, to a device [402] which worked to dispense care. Such a request might list symptoms observed by the smart car [401] in a table of the type shown in FIG. 5.1. When it received the request from the smart car [401], the device [402] which provides care might check to see if the data indicated that any problems it was able to diagnose were present in the smart car [401]. For example, the device [402] might be able to check if the data indicated that the smart car [401] had worn out brakes. If the data did indicate worn out brakes, the device [402] might send a solution back to the smart car [401], such as recommending to the user of the car to get his or her brakes checked. If the data did not indicate worn out brakes, then the device [402] might determine where else on the network to send the data and the care request from the smart car [401].

In order to demonstrate how the routing decision might be made, assume another device [404] hosted aspects enabling it to check the symptoms of the right hand column of the table in FIG. 6.1, for the underlying causes of the left hand column of the table of FIG. 6.1, while yet another device [403] hosted aspects enabling it to check the symptoms of the right hand column of FIG. 6.2 for the underlying causes in the left hand column of FIG. 6.2. In that case, the device [402] which had attempted to provide care would not send the request to the device [403] which broadcast the table of FIG. 6.2 because that device [403] only treated the symptoms of poor cornering and poor traction, and the care request originally sent by the smart car [401] did not indicate those symptoms. On the other hand, the device [402] which had already attempted to provide care might send the data to the device [404] which broadcast the table of FIG. 6.1, because that table indicates that the device [404] which broadcast it does treat some of the symptoms observed by the smart car [401] and that it does so by checking for underlying causes which were not already examined by the first device [402]. Thus, the device [402] which had already attempted to provide care might route the data provided by the smart car [401] to the device [404] broadcasting the table of FIG. 6.1. In routing the data, the device [402] which had already attempted to provide care might, in some embodiments of the invention, send the table shown in FIG. 5.2 along with the data, to indicate that the underlying cause of worn out brakes had already been checked. When it received the data originally provided by the smart car [401] and the table of FIG. 5.2 indicating what underlying causes had already been checked for the symptoms indicated by the data, the next device [404] to attempt to provide care could examine the data for the underlying causes of bald tires and improper use of brake. If that device [404] was able to diagnose and solve the problem indicated by the data sent by the smart ear [401], it might send its solution back to the smart car [401]. If the device [404] was not able to solve the problems indicated by the data sent by the smart car [401], it might check to see if it had a network connection to some other devices [405] which might have the capacity to provide care. If one of the other devices [405] did indicate that it had the capacity to provide care, then the device [404] which had most recently attempted to provide care might send the data sent from the smart car [401] along with a table of the type shown in FIG. 5.3, indicating that in addition to bald tires, the data had been checked for indications of improper use of brake and worn out brake. In some embodiments of the invention, this process might continue until the problems indicated by the data sent by the smart car [401] had eventually been solved. In some embodiments of the invention, the devices working to dispense care might eventually use a WAN connection to a remote server [407] to provide care which was beyond all of their collective capacity.

Note that the above algorithm is a simplified description of one method for routing requests which could be utilized in various embodiments of the invention, and is not intended to limit the algorithms which could be used by various embodiments of the invention. For example, in some embodiments, given sufficient network resources, all care requests could be logged at a central knowledge base which, if it detected that certain underlying causes were particularly frequent, could distribute care applications dealing with those causes throughout the network, in order to increase the efficiency with which the network could provide care. Alternatively, in situations where network bandwidth is limited, some embodiments of the invention might modify the above algorithm to include information on the number of devices which had attempted to service a given request, and might delete a request if some number of devices had failed to find a solution, thus decreasing the number of requests on the network at any one time. Yet a third refinement would be to augment the tables in FIGS. 6.1 and 6.2 with information related to the services provided by the aspects hosted by devices in the vicinity of the broadcasting device, along with their distance from that device in terms of number of network connections, allowing a less random routing of the care requests. Yet another refinement would be for the maintenance of a list containing information about the services provided by the aspects hosted by each device in the network that devices might query to determine where to send care requests. Similarly, in some embodiments of the invention, the devices of FIG. 4 might be replaced with networks of devices that collaborate to dispense care, rather than distinct devices that do so. Other embodiments of the invention might implement routing protocols which would reserve the capabilities of more expensive devices for more difficult problems. For example, the devices in a collaborative e-Care Dispenser might be organized by capacity as shown by the table in FIG. 1. A network which used such organization might try to process any requests on lower capacity devices before escalating the request to a device with greater capacity, thus conserving the resources of the high capacity devices on the network. Of course, which of these or other refinements should actually be implemented on any particular system would be determined by the resources available to that system.

In addition to differing ways of structuring e-Care dispensers, different embodiments of the invention could allow for different ways of determining what solutions to use. Some embodiments of the invention might simply utilize a particular set of care applications which were known to be effective for a given set of devices. Other embodiments of the invention might segregate different devices in order to test different applications on different sub-populations in order to determine which application worked best. The applications with the best performance might then be distributed to all devices on the network, thereby automatically improving system efficiency. Of course, the invention is intended to be applicable to all types of networks, application creation methods, and solution distribution functions, and it should be understood that the embodiments listed above are no more than examples.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A method of cooperatively processing a care request, the method comprising the steps of:
(a) creating, at a requesting end user device in a plurality of end user devices, a care request comprising a set of data relating to a fault in operating the requesting end user device;
(b) receiving, at a processing end user device in the plurality of end user devices, the care request;
(c) utilizing the processing end user device to initiate processing of the care request;
(d) assembling a set of working data comprising an indication of a first cause which had been examined to determine a first relationship between the first cause and at least one symptom from one or more symptoms indicated by the set of data comprised in the care request;
(e) evaluating an option of processing the care request using an additional device, wherein evaluating the option of processing the care request using the additional device comprises determining if the additional device has a capability to determine a second relationship between a second cause and at least one symptom from the one or more symptoms indicated by the set of data comprised in the care request;
(f) after utilizing the processing end user device to initiate processing of the care request, utilizing the additional device to continue processing of the care request; and
(g) after utilizing the additional device to continue processing of the care request, determining a response to the care request.

2. The method of claim 1 wherein the additional device is a back end device.

3. The method of claim 1 wherein the fault in operating the requesting end user device comprises a high charge for operating the requesting end user device.

4. The method of claim 3 wherein:
a) utilizing the additional device to continue processing of the care request comprises requesting the additional device to provide information regarding a rate plan for the requesting end user device; and
b) determining the response to the care request comprises determining a modification related to operating the requesting end user device based at least in part on:
i) the information regarding the rate plan for the requesting end user device; and
ii) information indicating operation of the requesting end user device which resulted in the high charge.

5. The method of claim 4, wherein the modification is selected from a list consisting of:
a) modifying the rate plan for the requesting end user device to correspond to the information indicating operation of the requesting end user device; and
b) modifying a schedule for operating the requesting end user device.

6. The method of claim 1 wherein the fault in operating the requesting end user device comprises an inability to activate a functionality of the requesting end user device.

7. The method of claim 6, wherein processing the care request comprises identifying an incorrect operation of the requesting end user device which results in the inability to activate the functionality.

8. The method of claim 6, wherein processing the care request comprises identifying a contract governing operation of the requesting end user device which results in the inability to activate the functionality by excluding the functionality.

9. A method of providing care for an end user device comprising:
(a) creating a care request comprising data related to a fault in operating the end user device;
(b) cooperatively processing the care request using a plurality of devices, wherein cooperatively processing the care request comprises:
(i) receiving, at a first device, the care request comprising data related to the end user device;
(ii) using a first functional aspect hosted on the first device to process the care request;
(iii) assembling a set of working data comprising an indication of a first cause which had been examined to determine a first relationship between the first cause and at least one symptom from one or more symptoms indicated by the data comprised in the care request;
(iv) evaluating an option of processing the care request using a second device, wherein evaluating the option of processing the care request using the second device comprises determining if the second device has a capability to determine a second relationship between a second cause and at least one symptom from the one or more symptoms indicated by the data comprised in the care request; and
(v) using a second functional aspect hosted on the second device to continue processing the care request.

10. The method of claim 9 wherein the step of cooperatively processing the care request is performed even though no single device of the plurality devices can completely process the care request independently.

11. The method of claim 9 wherein the fault in operating the end user device comprises a high charge for operation of the end user device.

12. The method of claim 9 wherein the fault in operating of the end user device comprises an inability to activate a functionality of the end user device.

13. The method of claim 12, wherein cooperatively processing the care request comprises identifying an incorrect operation of the end user device which results in the inability to activate the functionality.

14. The method of claim 12, wherein cooperatively processing the care request comprises identifying a contract governing operation of the end user device which results in the inability to activate the functionality by excluding the functionality.

15. A machine comprising:
(a) a plurality of devices;
(b) a plurality of functional aspects, said functional aspects hosted on the devices throughout the plurality of devices;
(c) a first set of computer executable instructions stored on a first non-transitory computer readable medium in an end user device from the plurality of devices, the first set of computer executable instructions configuring the end user device to create a care request comprising a set of data related to a fault in the operating the end user device;
(d) a second set of computer executable instructions stored on a second non-transitory computer readable medium in a second device from the plurality of devices, the second set of computer executable instructions configuring the second device to perform a sets comprising:
(i) initiate processing of the care request using a first functional aspect hosted on the second device;
(ii) assemble a set of working data comprising an indication of a first cause which had been examined to determine a first relationship between the first cause and at least one symptom from one or more symptoms indicated by the set of data comprised in the care request; and
(iii) evaluate an option of processing the care request a using a third device, wherein evaluating the option of processing the care request using the third device comprises determining if the third device has a capability to determine a second relationship between a second cause and at least one symptom from the one or more symptoms indicated by the set of data comprised in the care request; and
(e) a third set of computer executable instructions stored on a third non-transitory computer readable medium in the third device from the plurality of devices, the third set of computer executable instructions configuring the third device to continue processing of the care request using a second functional aspect hosted on the third device.

16. The machine of claim 15 wherein the fault in operating the end user device comprises a high charge for operating the end user device.

17. The machine of claim 15 wherein the fault in operating the end user device comprises an inability to activate a functionality of the end user device.

18. The method of claim 17, wherein processing the care request comprises identifying an incorrect operation of the end user device which results in the inability to activate the functionality.

19. The method of claim 17, wherein processing the care request comprises identifying a contract governing operation of the end user device which results in the inability to activate the functionality by excluding the functionality.

* * * * *

UNITED STATES PATENT AND TRADEMARK OFFICE
CERTIFICATE OF CORRECTION

| | |
|---|---|
| PATENT NO. | : 8,145,713 B1 |
| APPLICATION NO. | : 13/209872 |
| DATED | : March 27, 2012 |
| INVENTOR(S) | : Scott A. Irwin et al. |

It is certified that error appears in the above-identified patent and that said Letters Patent is hereby corrected as shown below:

Column 18, Claim 15, line 56, reads "...fault in the operating..."; which should be deleted and replaced with "...fault in operating...."

Column 18, Claim 15, line 62, reads "...to perform a sets comprising..."; which should be deleted and replaced with "...to perform a set of acts comprising...."

Signed and Sealed this
Eighth Day of May, 2012

David J. Kappos
*Director of the United States Patent and Trademark Office*